L. G. MASSOW.
Lantern.

No. 215,012. Patented May 6, 1879.

ATTEST:
John W. Herthel
Chas. Herthel

INVENTOR:
Louis G. Massow
per Herthel & Co

UNITED STATES PATENT OFFICE.

LOUIS G. MASSOW, OF ST. LOUIS, MISSOURI.

IMPROVEMENT IN LANTERNS.

Specification forming part of Letters Patent No. 215,012, dated May 6, 1879; application filed January 17, 1879.

*To all whom it may concern:*

Be it known that I, LOUIS G. MASSOW, of the city of St. Louis and State of Missouri, have invented an Improved Lamp and Lantern, of which the following is a specification.

This invention pertains to that class of lamps, lanterns, and devices that produce illumination by a burning wick.

The chief objects of my improvements consist in forming a safe lamp and lantern free from the dangers of explosion, adapted to burn specially petroleum-oils, serviceable for all purposes and uses where a clear, bright, and steady light is required, and that can be used with or without a glass chimney.

I will first fully describe the construction of my improvements, and hereinafter point out the novel parts thereof in the claims.

Figure 1:
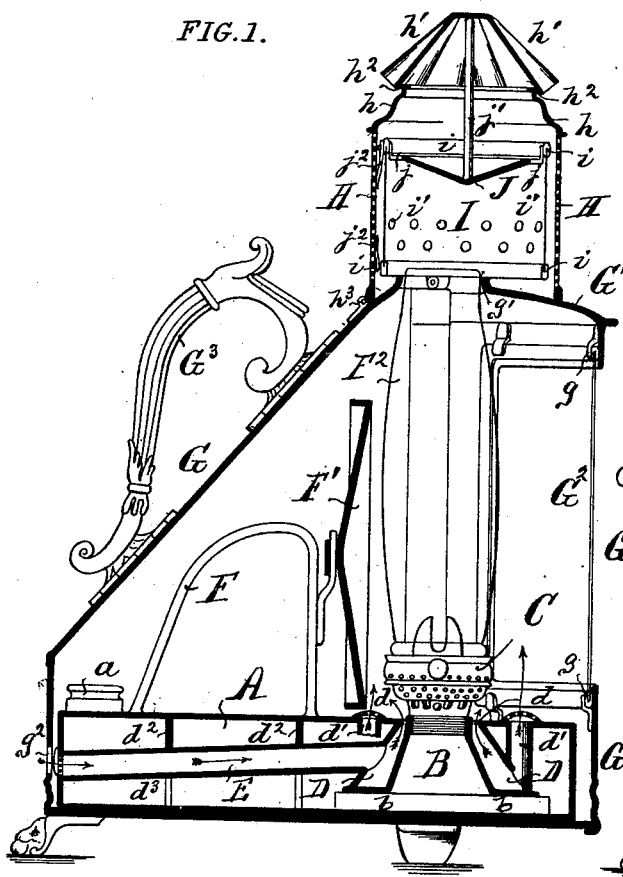
Figure 2:
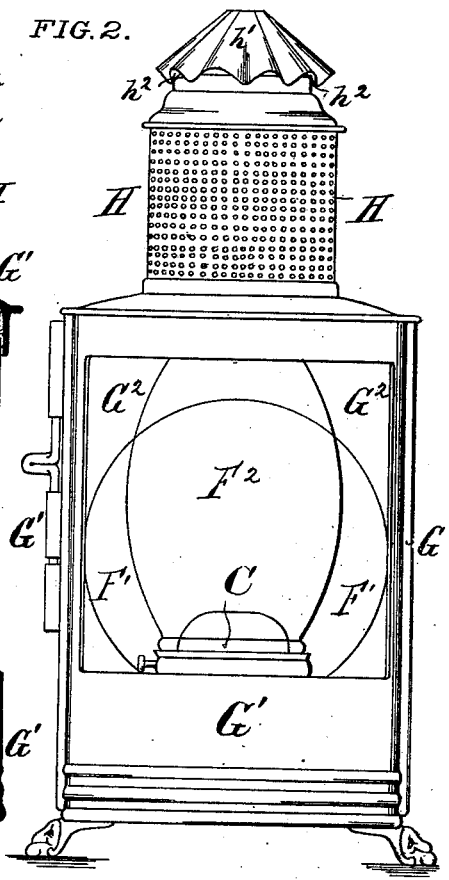
Figure 3:
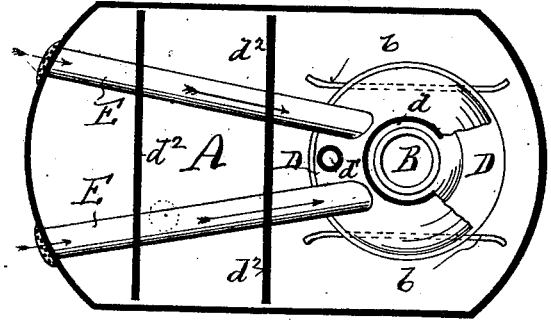
Figure 4:
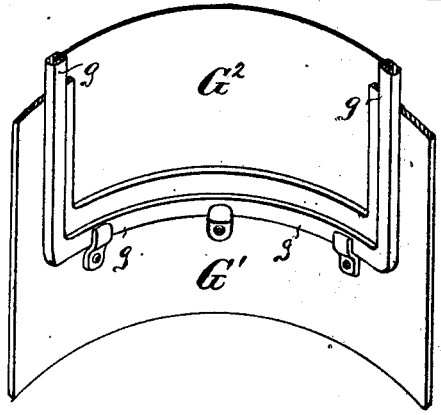

Of the drawings, Figure 1 is a sectional elevation of my improved lantern. The same figure, with the outside casing and its chimney-top removed, represents, in sectional elevation, my improved lamp. Fig. 2 is a front elevation of Fig. 1. Fig. 3 is a plan view, with cover or top removed, of the oil-reservoir, showing its internal parts that render the device non-explosive, supply air for combustion, also prevent overheating of the glass chimney when it is used. Fig. 4 is an enlarged elevation of the inside of the hinged door of casing, showing the manner of securing the isinglass to said door, also constructive shape of same.

A is the oil-reservoir. This, as shown in Figs. 1, 2, 3, is a vessel closed on all sides to contain any proper capacity of coal-oil. The oil is entered into the reservoir through the inlet at top, which is controlled by a screw-cap, $a$. Through the circular opening in the top of the reservoir the burner is passed to screw on or off the oil-fount B. (See Figs. 1, 3.)

The novel arrangement of parts within the oil-reservoir is as follows: I term B the oil-fount, as it is that part of the oil-reservoir to which the burner with its wick is applied. The oil-fount consists of a cone-shaped shell having open bottom and threaded neck. (See Figs. 1, 3.) The fount B is joined to top of opposite vertical sides $b$, which form part of the bottom of the reservoir. The oil in the reservoir also fills the cone-shaped chamber or oil-fount B, and in this latter the wick is also contained. To the screw-neck of the oil-fount the burner with wick, marked C, is applied. (See Figs. 1, 2.) Any ordinary burner can be applied and used.

Surrounding the oil-fount B (except that portion of its bottom which permits the oil to enter same) I have provided an air-chamber, D. This consists of a duplicate cone-shaped shell with closed bottom, and also made a closed joint with the top of the reservoir. (See Figs. 1, 3.)

It will be noted that between the screw-neck of the fount B and the shell of the air-chamber a small circular opening, $d$, exists. (See Figs. 1 and 3.) The purpose of this opening $d$, which is immediately below the burner, is to supply from the air-chamber the air or oxygen thereof necessary to combustion.

The purpose of the air-chamber D is to surround the oil more directly contained in the oil-fount B with as cool a temperature as the outside atmosphere, to insure a continued circulation of cool currents of air immediately from below the burner, and thus prevent the overheating of the oil or the formation of explosive gases. The outside atmosphere enters the air-chamber through the air-pipes E E. Both said pipes (see Figs. 1, 3) pass lengthwise from the air-chamber through the interior of the reservoir A, so that the cool circulation of air through said pipes and air-chamber also cools and equalizes the temperature of the oil contained in said reservoir. When the lamp or lantern is used the circulation of air will be therefore as indicated by the arrows in Fig. 1, the fresh air entering the air-pipes at the rear, from thence into the air-chamber, from which the escape is twofold through the opening $d$, before alluded to, and through the farther air-tubes $d^1$ $d^1$, which are arranged one in front and the other at the rear of the air-chamber. (See Figs. 1, 3.) The purpose of both these air-tubes is to obtain a continued circulation of air or currents of air to pass in front of the reflector, and also to surround and cool the faces of the glass chimney when used.

The openings that lead to the air-pipes, also the tubes, are covered with a perforated plate, so that the air-currents shall be in the nature of fine streams of air; also said covers prevent impurities and foreign matter entering said openings.

$d^2$ are partitions transversely arranged inside the oil-reservoir. These partitions have openings $d^3$ below to allow for the oil to reach the oil-fount. These partitions serve to break the force of the oil and steady same in cases where the lamp or lantern is roughly handled.

Top of the reservoir A is the handle F, to which the reflector $F^1$ is hung. (See Figs. 1 and 2.) $F^2$ is the glass chimney.

The parts thus far described, consisting of the oil-reservoir A, its interior air-pipes, air-chamber, oil-fount chamber, burner, reflector, and glass chimney, virtually constitute my improved lamp. A lamp thus constructed gives forth a soft, brilliant, and steady light.

In deriving its needed supply of air for combustion from the air-chamber, there is established a continuous circulation of fresh air to take place of that which becomes more rarefied, and this circulation can be stated to produce the following results: First, drawing in fresh-air currents through the pipes to supply the air-chamber in proportion with the combustion that takes place, and, further, in so doing keeping the oil in the entire reservoir in equal temperature with that of the outside atmosphere; secondly, the air-chamber continually supplies fresh air to the burning wick or flame; thirdly, the circulation of air protects the reflector and glass chimney from overheating.

By this system of air-circulation no explosive gases can be formed; hence the lamp or lantern is rendered absolutely safe and non-explosive; also the fracture, breakage, and loss of glass chimneys from heat or explosion is obviated.

The lamp, constructed as above described, is made a lantern by placing the lamp inside of the casing and its chimney parts, now to be described.

G is the metal casing or housing for the lamp. The constructive shape of the casing, as shown in Figs. 1 and 2, conforms to the snug fit that the lamp requires. The lamp is so shown housed in Figs. 1, 2.

The front of the casing is the hinged door $G^1$. This is made of a semicircular form or shape, so that the light can be seen from the sides and front, and to obtain as great a reflection of the light as possible.

The inside face of the door is provided with flanged faces $g$, in which the isinglass $G^2$ can readily be inserted. The reflection takes place through the isinglass part of the door; hence this, as shown, (see Figs. 1, 2, 4,) occupies a greater part of the door.

The top of the casing (and door) in line with the glass chimney has an opening, $g^1$, (see Fig. 1,) through which the chimney can project. Near bottom of the casing its sides have holes or perforations $g^2$ (see Fig. 1) for the admission of outside air to supply the circulation of air for the oil-reservoir and its parts. $G^3$ is a handle for the better handling of the casing or lantern.

The top chimney consists, first, of the outside cylinder casing, H, and its interior isinglass chimney, I. That of H has its cylinder entirely perforated. Further, it has the rim $h$, which is open at top, and this latter is covered by the corrugated top $h^1$. (See Figs. 1 and 2.) It is through the corrugated openings $h^2$ that the exit of the warm air generated by the flame takes place out of the chimney. Small air-currents from the outside can enter the perforations of this outside cylinder to facilitate this exit of the warm air. The chimney part H thus made is hinged at $h^3$, top of the casing, and in line with the glass chimney. Inside the chimney part H is the isinglass chimney I. This also consists of a cylinder framed in the top and bottom circular rims $i$, leaving open the top and bottom ends of the said cylinder. The isinglass cylinder has a series of small holes, $i'$, so that the air entering the outside cylinder also enters the inside cylinder, and facilitates the upward passage and exit of the warm air.

Specially to prevent gusts of air from the outside entering the chimney, extinguishing the flame, &c., I have attached the cone-partition J to near top of the inside cylinder. An opening is left at $j$ between the cone-partition and the inside cylinder for the free upward passage of the warm air.

$j^1$ is a stem projecting from the top of the cone-partition to the inside top of the corrugated cover, in order to limit and properly seat or position the inside cylinder. This latter is also properly retained in its place by springs $j^2$, which are attached to its sides, and all of which is shown in Fig. 1. The cone-partition intercepts the downward passage of the outside air or wind entering the corrugated openings, and hence the flame remains protected.

My improved lamp or lantern is thus adapted for both private as well as public uses.

Having thus fully described my invention, what I claim is—

1. The oil-fount B, surrounded by the air-chamber D, the air-pipes E E, the opening $d$, the burner C, and oil-reservoir A, all said parts being combined and arranged to operate in the manner and for the purposes set forth.

2. In combination with the reservoir A, oil-fount B, burner C, glass chimney $F^2$, the air-tubes $d^1$ $d^1$, leading to the air-chamber D, which communicates by pipes E E to the outside atmosphere, as and for the purposes set forth.

3. The isinglass cylinder I, open at top and bottom, having the perforations $i'$, the top and bottom rims $i$, the springs $j^2$, in combination with the perforated cylinder H, having the corrugated top $h^1$, as and for the purposes set forth.

4. The cone-partition J, the isinglass cylinder I, having openings at $j$ and $i$, the spring openings $j^2$, in combination with the outside perforated cylinder, H, with its corrugated top $h^1$, as and for the purposes set forth.

5. The chimney-tops consisting of the outside perforated cylinder, H, its rim $h$, corrugated top $h^1$, openings $h^2$, the interior perforated isinglass cylinder, I, open at bottom, at top having the openings, $j$, the cone-partition J, said parts being arranged in combination with a lantern, to operate in the manner and for the purposes set forth.

6. The improved lantern consisting of the oil-reservoir A, the air-pipes E E, the air-chamber D, oil-fount B, the opening $d$, the air-tubes $d^1$ $d^1$, burner C, chimney $F^2$, reflector $F^1$, outside casing, G, having the openings $g^2$, hinged door $G^1$, with its framed isinglass $G^2$, and the chimneys H I, all said parts being constructed and arranged substantially in the manner and for the purposes set forth.

In testimony of said invention I have hereunto set my hand.

LOUIS G. MASSOW.

Witnesses:
WILLIAM W. KERTHEL,
THOS. J. MONTGOMERY.